United States Patent [19]

Alford et al.

[11] Patent Number: 5,233,428
[45] Date of Patent: Aug. 3, 1993

[54] ELECTRONIC EXPOSURE CONTROL SYSTEM FOR A SOLID STATE IMAGER

[75] Inventors: Steven M. Alford, North Babylon; Ralph A. Layer, Selden; Thomas H. Traynor, Laurel Hollow, all of N.Y.

[73] Assignee: Loral Fairchild Systems, Syosset, N.Y.

[21] Appl. No.: 788,217

[22] Filed: Nov. 5, 1991

[51] Int. Cl.$^5$ .......................................... H04M 5/335
[52] U.S. Cl. .......................... 358/213.19; 358/213.13
[58] Field of Search ................ 358/213.19, 213.11, 358/213.13, 228, 213.22, 213.23, 213.28; 354/410, 430; 250/205, 206, 208.1

[56] References Cited

U.S. PATENT DOCUMENTS

| | | | |
|---|---|---|---|
| 4,800,435 | 1/1989 | Ikeda et al. | 358/213.19 |
| 4,984,002 | 1/1991 | Kokubo | 358/213.13 |
| 5,003,398 | 3/1991 | Suzuki | 358/209 |
| 5,040,070 | 8/1991 | Higashisutsumi et al. | 358/213.13 |
| 5,057,926 | 10/1991 | Watanabe | 358/213.11 |

FOREIGN PATENT DOCUMENTS 1-68076  3/1989  Japan .

OTHER PUBLICATIONS

Sales Brochure from Sekai Electronics of America, Inc., Sony Announces! XC-999 color camera.

Primary Examiner—Herbert Goldstein
Assistant Examiner—Tuan V. Ho

[57] ABSTRACT

A system and method for electronically controlling charge coupled device (CCD) light sensitivity. The present invention controls CCD light sensitivity by electrically controlling a CCD such that the CCD discharges charge for a percentage of a field integration period. In other words, the present invention electronically varies the CCD's exposure time. The present invention operates as follows. First, the present invention calculates a new exposure time for a field integration period. Second, the present invention electrically causes the CCD to discard charge accumulated by the CCD during the field integration period except during a portion of the field integration period defined by the new exposure time.

26 Claims, 9 Drawing Sheets

ELECTRONIC EXPOSURE CONTROL SYSTEM FOR A SOLID STATE IMAGER

BACKGROUND OF THE INVENTION

1. Field Of The Invention

The present invention relates generally to imaging systems or camera systems (such as photographic and video cameras), and more particularly to exposure controls for imaging systems/camera systems.

2. Related Art

The use of charge coupled devices (CCDs) in camera imagers has enabled the production of smaller and more durable camera imagers. Much effort has been spent in developing exposure control systems for effectively controlling imager sensitivity to incident light on the imager (that is, for controlling the amount of charge a CCD accumulates during a field integration period). Exposure control systems which regulate CCD exposure sensitivity, such that picture quality is unaffected by changing environmental lighting conditions, are desired. Such exposure control systems greatly expand the dynamic range of performance of CCD-based imagers, thereby increasing the commercial market for CCD-based camera imagers. Herein, light refers to visible and non-visible light.

In many conventional CCD-based camera imagers, the exposure control systems are implemented using mechanical devices. Such mechanical devices include a mechanical iris and/or a mechanical shutter wheel. The most common implementation, the mechanical iris, varies the rate at which the CCD receives photons. The mechanical shutter varies the amount of time during which the CCD receives photons.

Such exposure control systems are flawed, however, since mechanical devices have a relatively low reliability, slow response time, and increase the size and cost of the lens. Additionally, such exposure control systems are flawed since the use of mechanical devices increases the technical difficulty in the areas of loop stability and design transition between different lenses.

In some tube based cameras, such as some "VIDICON" cameras, the exposure control systems can be non-mechanical in nature. Such exposure control systems automatically control imager sensitivity by controlling the voltage on the tube's target electrode.

Since vacuum tube type imagers are larger and less rugged than solid state imagers, solid state imager based cameras such as CCD cameras are being used in place of the older tube technology based cameras. In order to match all performance aspects of tube based cameras with CCD based cameras, a non-mechanical exposure control system for controlling CCD sensitivity is required. Due to the different nature of the solid-state imager to the tube imager, the same electronic exposure control technique as the tube-based imager cannot be utilized for the solid-state imagers. There is no analogous sensitivity altering technique for the solid-state imager similar to the tube's target electrode voltage. Therefore, a different technique to achieve similar electronic light control for the solid state imager is required.

Several major CCD suppliers offer on-chip shuttering options. On-chip shuttering is the electronic process that allows accumulated charge in the charge storage wells to be dumped before the end of the normal integration time. This allows the exposure interval per imaging cycle to be varied, enabling high speed stop action effects. This change in exposure interval also results in a corresponding change in sensor sensitivity. Currently, light control systems based solely on on-chip shuttering do not exist. This is due to the many restrictions imposed due to CCD timing constraints and undesirable imaging side-effects upon application of an electronically variable exposure setting.

Thus, a high performance exposure control system for effectively controlling CCD sensitivity is required.

SUMMARY OF THE INVENTION

The present invention is directed to a system and method for electronically and automatically controlling charge coupled device (CCD) light sensitivity to achieve optimum imager performance under varying light conditions. The present invention applies to color and monochrome, as well as non-visible applications.

The present invention does not control CCD light sensitivity by regulating the amount of photons incident on the CCD. Also, the present invention does not use electromechanical devices to control CCD light sensitivity.

Instead, the present invention controls CCD light sensitivity by electrically controlling a CCD such that the CCD discharges the charge resultant from incident light for a percentage of a field integration period. In other words, the present invention electronically varies the CCD's exposure time.

The present invention operates as follows. First, the present invention calculates a new optimum exposure time for the next field integration period based on the present video output level (which is a product of the present amount of light incident on the CCD and the present exposure period). Second, the present invention electrically causes the CCD to discard charge accumulated by the CCD during the field integration period, except during a portion of the field integration period defined by the new exposure time.

The present invention calculates the new exposure time as follows. First, the present invention determines the measured video signal level from the imager's video output, which represents the charge accumulated in the CCD. Second, the present invention calculates a correction factor by comparing the measured video signal level to the desired video signal level. Third, the present invention calculates the new exposure time by using the correction factor to modify an old exposure time. Fourth, the present invention incorporates hysteresis to prevent electronic exposure "hunting," otherwise resulting in observable video flicker. Fifth, the present invention applies the dump pulses only during periods when their application will not cause the CCD imager to produce unwanted video side-effects.

The present invention electrically causes the CCD to discard charge accumulated by the CCD as follows. First, the present invention determines the number of dump pulses needed during a discrete mode to attain the new exposure time. Second, the present invention determines the number of dump intervals needed during a continuous mode to attain the new exposure time. Third, the present invention generates a waveform having the dump pulses and dump intervals.

Further features and advantages of the present invention, as well as the structure and operation of various embodiments of the present invention, are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

The present invention will be described with reference to the accompanying drawings, wherein.

DETAILED DESCRIPTION OF THE PREFERRED EMBODIMENTS

1. Synchronizing Signal Waveform

Figure 3:
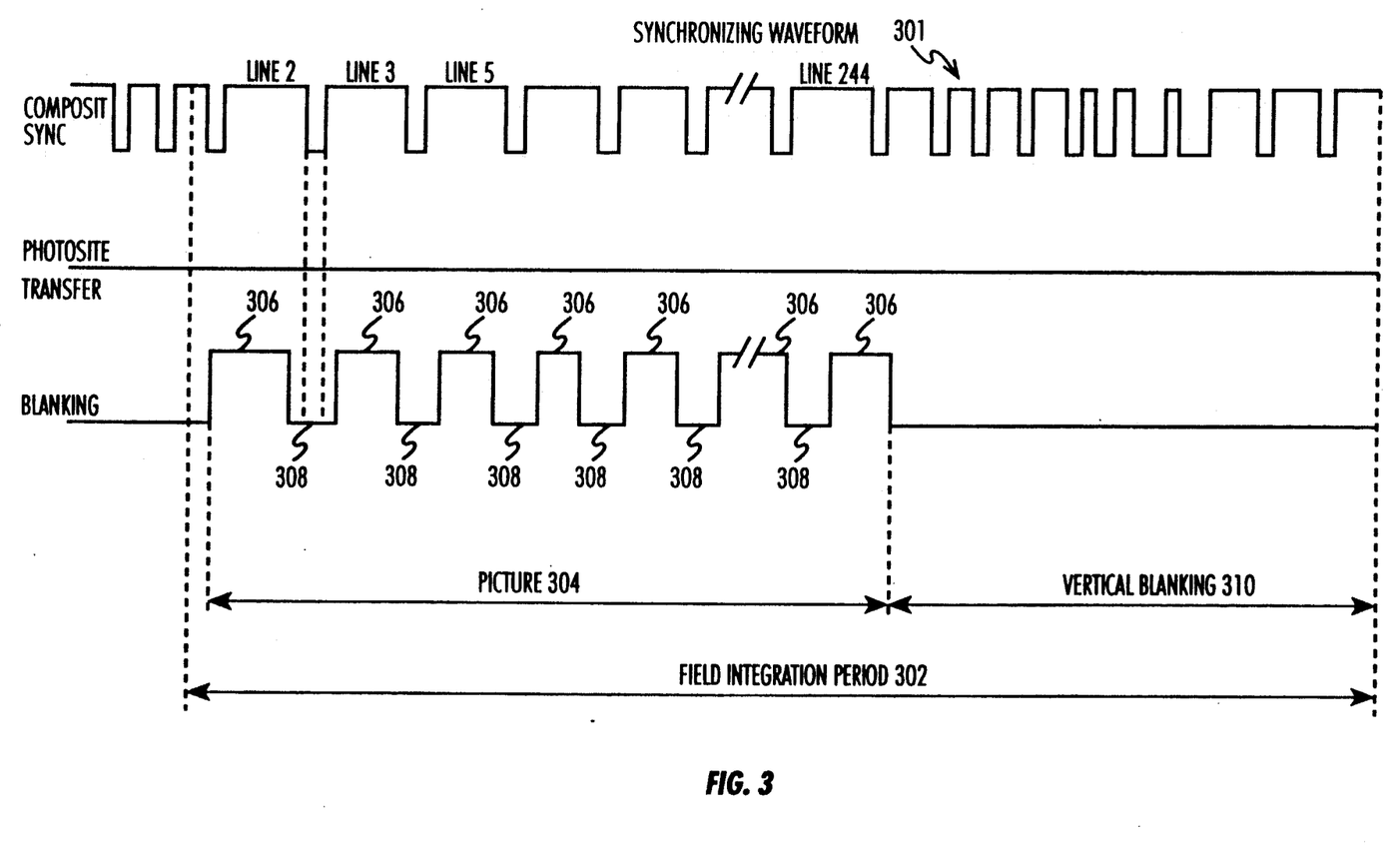
FIG. 3 illustrates a synchronizing signal waveform.

The present invention may be better understood by first considering a synchronizing signal waveform 301, as illustrated in FIG. 3. The synchronizing signal waveform 301 is used to reference the various scanning intervals of electronic imaging systems. Solid state imagers, such as video cameras, operate according to the synchronizing signal waveform 301. Electronic image displays, such as CRTs, trace images in synchronization to this signal 301.

The synchronizing signal waveform 301 comprises periodic intervals called field integration periods 302. A single field is traced during each field integration period 302.

Each field integration period 302 includes a picture interval 304 and a vertical blanking interval 310. The picture interval 304 includes active video intervals 306 and horizontal blanking intervals 308.

During the active video intervals 306, lines of a field are traced by an electron beam associated with a video display. During the horizontal blanking intervals 308, the electron beam intensity is blanked while the beam is positioned to the beginning of the next line of the field. During the vertical blanking interval 310, the electron beam intensity is blanked while the beam is positioned to the start of the next field.

In a preferred embodiment of the present invention, the field integration period 302 for CCDs is 1/60th of a second (approximately 16.7 msec). The picture interval 304 lasts approximately 15.6 msec. The vertical blanking interval 310 lasts approximately 1.1 msec. Each active video interval 306 lasts approximately 53 usec.

A common type of synchronizing signal waveform 301 is described in many publicly available documents, such as EIA-RS-170 and EIA-RS-343. EIA-RS-170 and EIA-RD-343 are standards developed by the Electronic Industries Association (EIA).

2. Overview of the Present Invention

This section presents an overview of the structure and operation of the present invention.

Figure 2:
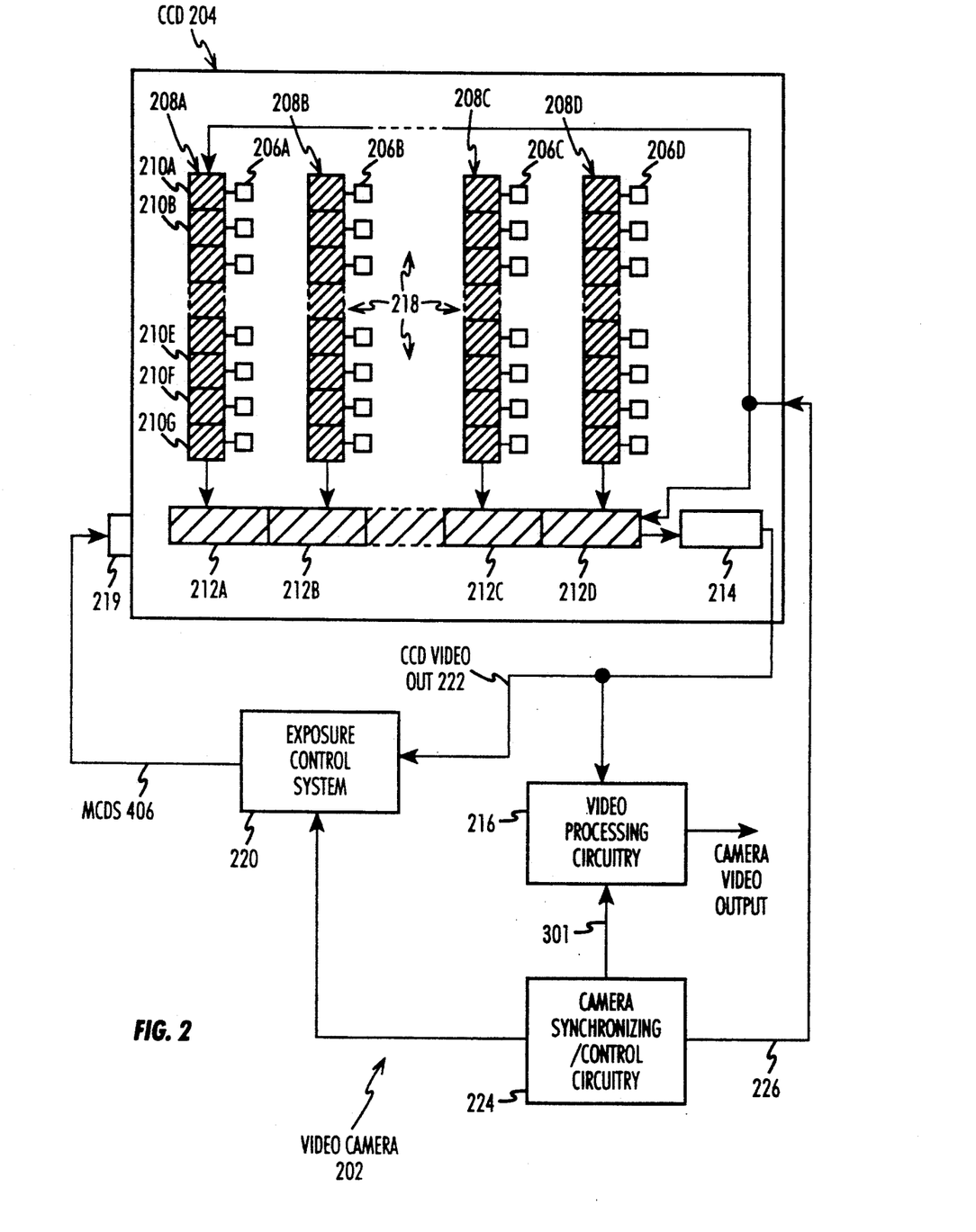
FIG. 2 illustrates a video camera according to the present invention.

FIG. 2 illustrates a video camera 202 according to the present invention. The video camera 202 includes a charge coupled device (CCD) 204, video signal processing circuitry 216, camera synchronizing/control circuitry 224, and an exposure control system 220. The CCD 204 includes photosensitive areas 206, vertical shift register areas 208, horizontal shift registers 212, a video output stage 214, a substrate region 218, and a substrate pin 219.

The photosensitive areas 206 and vertical transfer registers 208 are formed in rows 210. At the conclusion of each field integration period, the charge accumulated in the photosensitive areas 206 is transferred to the vertical shift register area 208. During the next field integration period, the charge transferred to the vertical shift register 208 is transferred sequentially downward one row 210, at a time, with the bottom row 210G moving to the horizontal shift register 212. This occurs at the TV line rate, once approximately every 63.5 microseconds for the EIA-RS-170, 525 line example. During each 63.5 microsecond line period, the horizontal shift register 212 is shifted rightward in similar fashion at a clock rate sufficient to move all charge out before the next vertical dump, 63.5 microseconds later. The charge is shifted into the video output circuit 214, which converts the charge to a voltage. Due to the clocking of the horizontal shift register 212, a serial stream of voltages, representing each individual photosite charge, is serially output, forming the video signal in a standardized format, EIA-RS-170, for example.

The video camera 202 operates generally as follows.

During a field integration period 302, the photosensitive areas 206 receive photons which originate from outside the video camera 202. The photons represent an image that is being recorded.

The photosensitive areas 206 convert the photons to electrical charge. This charge is transferred once per TV field to the adjacent vertical shift register areas 208. The photosensitive areas 206 store (or accumulate or integrate) the charge during the field integration period.

In conventional video cameras, the photosensitive areas accumulate charge during the entire field integration period 302. In other words, the exposure time (that is, the percentage of the field integration period 302 during which the charge storage areas accumulate charge) is constant. The conventional video cameras achieve light sensitivity by using light control systems which regulate the amount of photons incident on the CCDs.

According to the present invention, however, the amount of photons incident on the CCD is not regulated. Additionally, the photosensitive areas 206 accumulate charge for only a portion of the field integration period 302 (that is, the exposure time is not constant). The video camera 202 of the present invention achieves exposure sensitivity by using the exposure control system 220 to vary the exposure time. In other words, the exposure control system 220 determines the portion of the picture interval 304 during which the photosensitive areas 206 accumulate charge.

Specifically, the exposure control system 220 generates a modified charge dumping signal (MCDS) 406 which is applied to the substrate pin 219 of the CCD 204. According to a preferred embodiment of the present invention, the charge accumulated in the photosensitive areas 206 is discarded (or dumped) to a drain-off region (represented by the substrate region 218) when the modified charge dumping signal 406 has a low voltage value. Then, the photosensitive areas 206 restart accumulating charge. Such charge accumulation continues until the modified charge dumping signal 406 goes low again, or until the field integration period 302 expires. Thus, the duty cycle of the modified charge dumping signal 406 (as controlled by the exposure control system 220) determines the percentage of the field integration period 302 during which the photosensitive areas 206 accumulate charge.

After the field integration period 302 expires, the charge stored in the photosensitive areas 206 is transferred to the vertical shift registers 208. During the subsequent field integration period 302, the charge just transferred into the vertical shift register is sequentially shifted downward, row by row, into the horizontal shift register 212. For example, the charge in row 210A is moved into row 210B, 201B into 210C, etc., and row 210G into horizontal shift register 212.

The charge in the shift register 212 is sequentially shifted out, column-by-column, to the video output circuit 214. For example, the charge in column 212D is shifted out to the video output circuit 214. Simultaneously, the charge in column 212C is shifted to column 212D. This continues until the charge in column 212A is shifted through the register 212 and out to the video output circuit 214.

The video output circuit 214 generates a video out signal 222 by converting the electrical charges from the shift register 212 into a proportional voltage for each pixel. Thus, the video out signal 222 is a series of voltages corresponding to the electrical charges accumulated in each pixel.

The video out signal 222 is sent to the video signal processing circuitry 216 for further processing. The structure and operation of the video signal processing circuitry 216 is well known.

This video out signal 222 is also sent to the exposure control system 220. Based on the video out signal 222, the exposure control system 220 generates the modified charge dumping signal 406 for the next field integration period 302. Thus, the present invention includes a feedback loop (which includes the exposure control system 220) for controlling the light sensitivity of the CCD 204.

The camera synchronizing/control circuitry 224 orchestrates all of the charge accumulation and transfers described above, synchronizing all functions to yield the serial video stream in conformance to a video standard, such as EIA-RS-170. It generates CCD transfer clocks 226, as well as the video synchronizing signal waveform 301.

By using the charge accumulated during the current field integration period to control the amount of charge allowed to be accumulated during the next field integration period, the exposure control system 220 of the present invention minimizes changes in picture quality due to changes in environmental lighting conditions.

The manner in which the exposure control system 220 generates the modified charge dumping signal 406 is described below.

3. Design and Implementation Considerations

This section describes considerations which affected the design and implementation of the exposure control system 220 of the present invention.

3.1. Discrete Mode

Dumping charge during the active video intervals 306 creates increased signal pedestals, resulting in undesirable picture side-effects such as dark areas on the picture. Such increased signal pedestals reduces picture quality. Thus, the exposure control system 220 does not cause accumulated charge to be dumped during the active video intervals 306. Rather, with regard to the picture interval 304, the exposure control system 220 causes accumulated charge to be dumped only during the horizontal blanking intervals 308.

The exposure control system 220 is said to be in a "discrete mode" while in the picture interval 304 since the restriction to dump during only the horizontal blanking intervals 308 results in discrete steps in exposure time. These discrete steps are equal to the duration of each of the active video intervals 306 (that is, approximately 63.5 usec for the EIA-RS-170, 525 line example).

If the exposure control system 220 operated in only the discrete mode, then the exposure control system 220 would achieve an exposure time range from 63.5 usec (that is, a single step or a single line) to 1/60th of a second (that is, the entire field integration period 302) in increments of 63.5 usec.

However, there is a drawback to operating in only the discrete mode. This drawback is illustrated by Equation 1, which quantifies the percentage change in exposure time. In Equation 1, O equals an old exposure time and N equals a new exposure time. Both O and N are integral multiples of 63.5 usec.

$$\% \text{ Change in Exposure Time} = 100*((N-O)/O) \quad \text{Equation 1}$$

Suppose O equals three lines (that is, 190.5 usec) before the end of its field integration period (that is, the charge is accumulated only during the three discrete steps before the end of the field integration period—all other charge during the field integration period is dumped). Also suppose that N equals four lines (that is, 254 usec). According to this scenario, the percentage change in exposure time is 33%. A large percentage change in exposure time will result in noticeable video output level (brightness) steps occurring on the resultant displayed image.

It has been experimentally determined that a percentage change in exposure time by more than 3 to 4% is noticeable and sometimes distracting to the observer. Thus, there are drawbacks with operating exclusively in the discrete mode.

3.2. Continuous Mode

Dumping charge during the vertical blanking interval 310 does not create increased signal pedestals because the video is blanked during this period. Thus, the exposure control system 220 is allowed to cause the accumulated charge to be continuously dumped during the vertical blanking interval 310 with much finer resolution than the 63.5 usec steps of the discrete mode. Consequently, the exposure control system 220 is said to be in a "continuous mode" while in the vertical blanking interval 310 since accumulated charge may be continuously dumped.

The ability to continuously dump charge during the continuous mode offsets the drawbacks of the discrete mode. Specifically, without the continuous mode, the last charge dump during the discrete mode results in a percentage change in exposure time of 50%. With the continuous mode, however, the last charge dump during the discrete mode results in a much smaller percentage change in exposure time.

According to the present invention, the exposure control system 220 may cause accumulated charge to be dumped for a period encompassing either part of the discrete time interval, the entire discrete time interval, all of the discrete and part of the continuous time interval, or all of the discrete and all of the continuous time intervals. The exposure control system 220 generates the modified charge dumping signal 406 to control when and to what extent the accumulated charge is dumped.

Figure 4A:
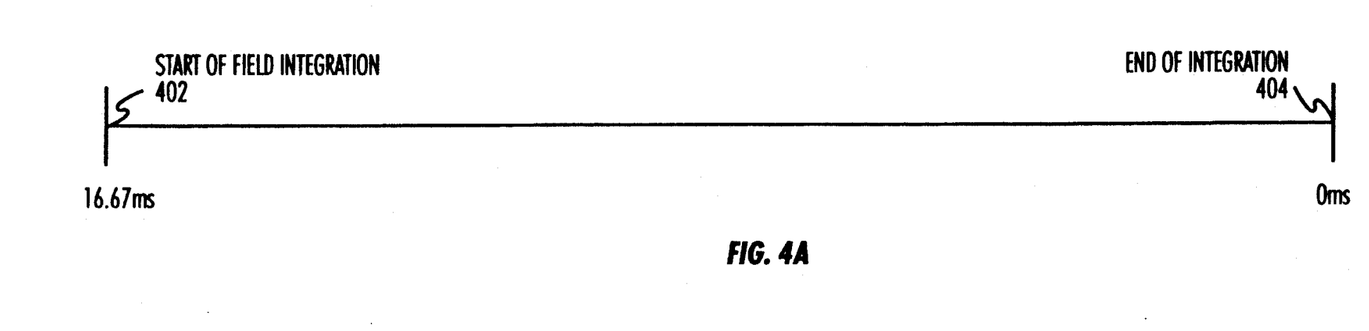
FIG. 4A illustrates a time line which shows a field integration period.
Figure 4B:
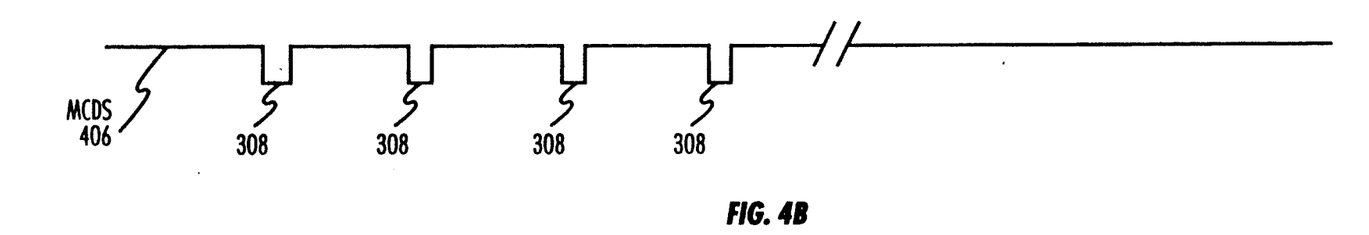
FIGS. 4B and 4C illustrate examples of a modified charge dumping signal according to the present invention.
Figure 4C:
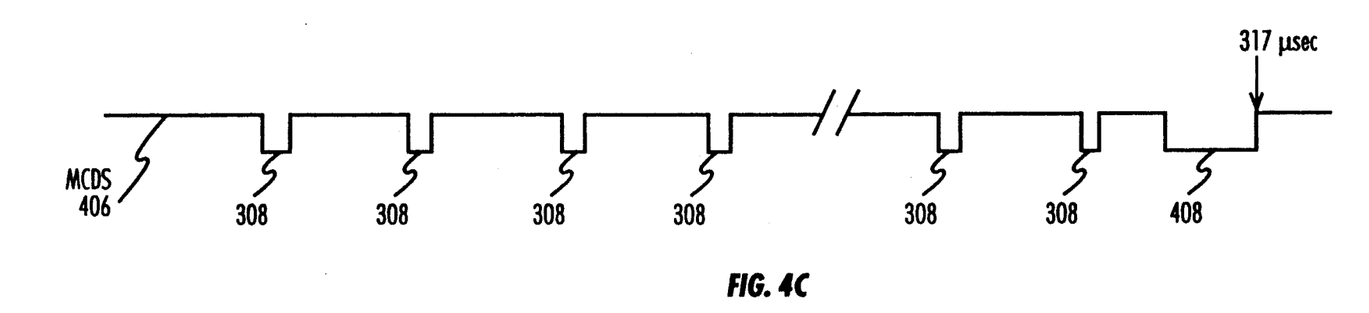

FIGS. 4A, 4B, and 4C illustrate examples of the modified charge dumping signal 406. Specifically, FIG. 4A illustrates a time line which shows a field integration period 402. FIGS. 4B and 4C illustrate examples of the modified charge dumping signal 406 which may be compared by reference to the time line in FIG. 4A.

In FIG. 4B, the exposure control system 220 has generated a modified charge dumping signal 406 such that accumulated charge is dumped only during a portion of the discrete mode. As shown in FIG. 4B, the modified charge dumping signal 406 contains four low pulses during the discrete mode. Thus, charge accumulated during four lines (that is, 254 usec) is dumped. Consequently, the total exposure time is approximately 16.4 msec.

In FIG. 4C, the exposure control system 220 has generated a modified charge dumping signal 406 such that accumulated charge is dumped during the entire discrete mode and the beginning of the continuous mode. Although not explicitly shown in FIG. 4C, the modified charge dumping signal 406 in FIG. 4C contains 249 low pulses during the discrete mode and 442 low increments during the continuous mode (in other words, the modified charge dumping signal 406 is low for approximately 486 usec during the continuous mode). Thus, the total exposure time is 369 usec.

4. Exposure Control System

According to the preferred embodiment of the present invention, the exposure control system 220 is implemented using a digital approach. The use of a digital implementation is advantageous for a number of reasons.

First, the hybrid nature of the exposure control system 220 due to its two modes of operation (that is, discrete and continuous) imposed tight restrictions upon response time and other loop stability criteria. A digital implementation, unlike an analog implementation, is well suited to satisfy such restrictions.

Second, without hysteresis, the exposure control system 220 will attempt to continuously hunt between light levels because the discrete nature of exposure time results in the inability to achieve totally optimum exposure time. This inability results in an instantaneous exposure error. While this small exposure error will not directly impact picture quality, it will, as a secondary effect, cause the exposure loop to alternate exposure times to the discrete value on either side of the optimal value. This "hunting" action manifests itself as a visible and sometimes distracting flicker in the output video image.

According to the present invention, the exposure control system 220 includes a hysteresis for avoiding this problem. An analog implementation of hysteresis for this control loop would require a significant amount of circuitry and require careful adjustment. A digital implementation can easily incorporate this hysteresis. Also, a digital implementation can implement this hysteresis without the use of select-at-test resistors or potentiometers (which might be required if an analog approach were used). Thus, the digital implementation facilitates high volume production since tuning and select-at-test requirements are not required (conversely, an analog approach requiring the use of select-at-test resistors or potentiometers would not be suited for high volume production).

Figure 5:
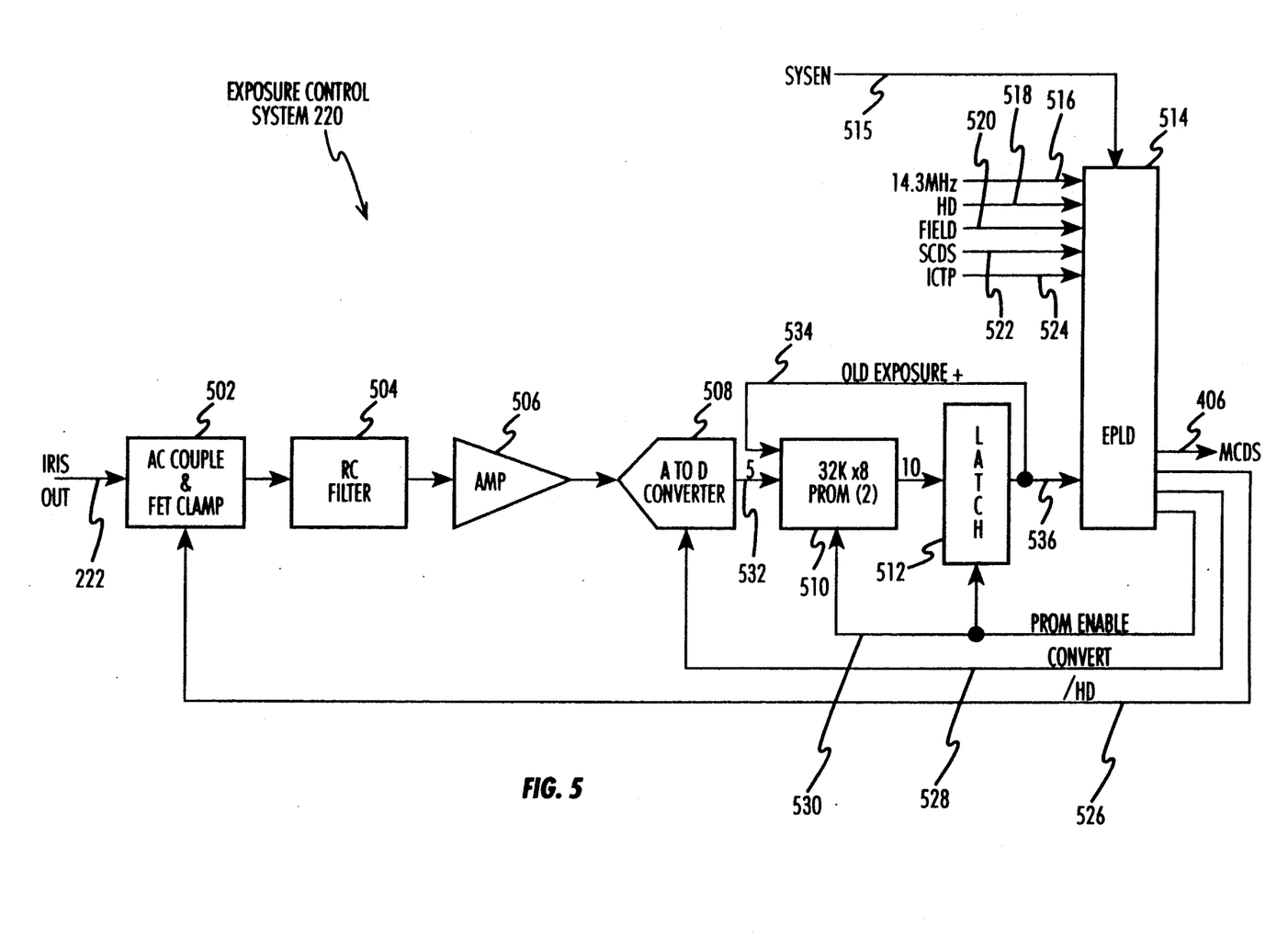
FIG. 5 illustrates a structural block diagram of the exposure control system of the present invention.

FIG. 5 illustrates a structural block diagram of the exposure control system 220. The exposure control system 220 includes an AC couple/FET black level clamp 502, a RC filter 504, an amplifier (AMP) 506, an analog to digital (A to D) converter 508, a programmable read only memory (PROM) 510, a latch 512, and an Erasable Programmable Logic Device (EPLD) 514.

According to the preferred embodiment of the present invention, the AMP 506 may be any general purpose op-amp with a gain-bandwidth product compatible with video signals (15 MHz in this example). The A to D converter 508 should have a minimum resolution of 6 bits and a conversion time of less than 90 microseconds.

The PROM 534 may be any type of 32K×8 EPROM, PROM, ROM, or OTP. The combined A to D conversion time and EPROM access time must be under 90 microseconds.

The EPLD 514 inner circuitry is a schematic based design using a hierarchal approach consisting of blocks of circuit primitives. Thus, this design can be easily translated between the various programmable devices and gate arrays. The EPLD 514 is available from Altera and Cypress.

Figure 1:
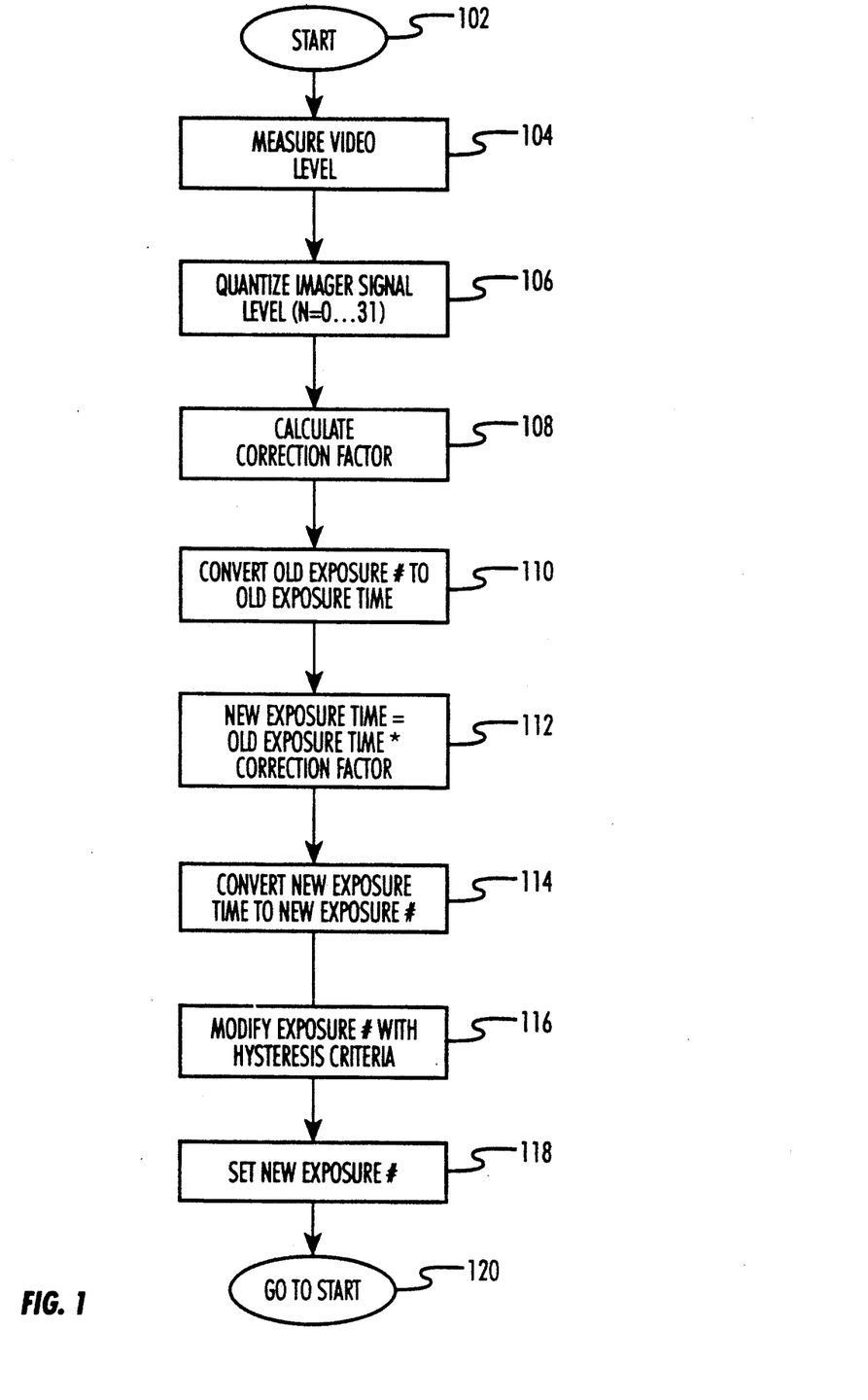
FIG. 1 presents a flowchart which illustrates the operation of an exposure control system of the present invention.

FIG. 1 presents a flowchart which illustrates the opeation of the exposure control system 220. FIG. 1 is described below with reference to the digital circuit shown in FIG. 5. Note, however, that the operation of the exposure control system 220 as illustrated in FIG. 1 may be implemented using different circuits.

In step 104, the video out signal 222 is measured.

Specifically, the AC couple/FET clamp 502 AC couples and clamps to ground the video out signal 222. The clamping function insures consistency of video input levels due to voltage variations of pre-clamped video versus temperature. This allows for calibrated comparisons after digitization. An inverted horizontal drive pulse (/HD) is used for providing the clamp pulse.

The RC filter 504, which is a low pass filter, produces a DC voltage which represents the CCD's video output level averaged over 3 to 4 frames (that is, approximately 150 msec). The cut-off frequency of the RC filter 504 determines the importance of higher frequency components of the image. The time constant of the RC filter 504 also determines the response time of the exposure control system 220. In the preferred embodiment of the present invention, the time constant of the RC filter 504 is 24 milliseconds. In an alternate embodiment, the video out signal 222 could have been peak detected, rather than averaged.

The amplification level of the AMP 506 is selected so that the highest specified output of the CCD 204, as derived from CCD data sheets, will not exceed the input range of the A to D converter 508. Thus, the exposure control system 220 may be implemented without potentiometers or select-at-test resistors.

In step 106, the DC voltage at the output of the AMP 506 is quantized by the A to D converter 508 into 5 bits. In other words, the average scene illuminance is represented as a value from 0 to 31.

Maximum video output occurs when the CCD 204 is saturated. This is represented by 31. The average video output is normally set to half saturation levels. Thus, in the preferred embodiment of the present invention, the level of 16 is selected as the desired digital light level. This selected level may be changed to suit the individual needs of each camera design.

The remaining steps in FIG. 1 are performed by the PROM 510 and EPLD 514. Generally, the PROM 510 and EPLD 514 utilize the output from the A to D converter 508 to determine how much change in exposure is required to produce an output of 16 (from the A to D converter 508). A new exposure setting (also called the new exposure time) is selected at the end of each field. The new exposure setting is calculated based upon the current 5 bit value from the A to D converter and the previous field's exposure setting (also called the old exposure time).

The exposure time, which is represented as a 10 bit control code, represents the number of dump pulses present in the Discrete mode and the number of 1.1 usec increments in the continuous mode. Note that the preferred digital implementation of the exposure control system 220, as shown in FIG. 5, implements the continuous mode using 1.1 usec increments during which accumulated charge is dumped. Smaller steps could be implemented during the continuous mode to achieve better exposure resolution at the expense of greater circuit complexity.

Returning now to FIG. 1, in step 108 the PROM 510 receives the output from the A to D converter 508. The PROM 510 also receives an old exposure number, which is a 10 bit control code corresponding to the old exposure time. The old exposure number is stored in the latch 512.

The PROM 510 calculates a correction factor (CF) according to Equations 2 and 3 (below), where N represents the output from the A to D converter 508 and K represents a damping factor.

According to the preferred embodiment, the mathematical and logical operations shown in Examples 2 and 3 are performed as part of the programming routine for the PROM 510. Specifically, Equations 2 and 3 are precalculated and their results are stored in the PROM 510. The PROM 510 is then used as a look up table. The input address to the PROM 510 is formed by concatenating the 5 bits of A/D output with the 10 bits of previous exposure number 534.

For $N > = 16$, $CF = 1 - K*((N/16) - 1)$        Equation 2

For $N < 16$, $CF = 1 + K*(1 - (N/16))$        Equation 3

The damping factor is necessary to allow the loop to stabilize due to the time constant of the RC filter 504. Note that the RC time constant is the dominant timing factor in the exposure control system 220 in FIG. 5. Without the damping factor, the exposure control system 220 may overshoot the correct exposure time. According to the preferred embodiment of the present invention, the damping factor is set to 0.4.

Figure 9:
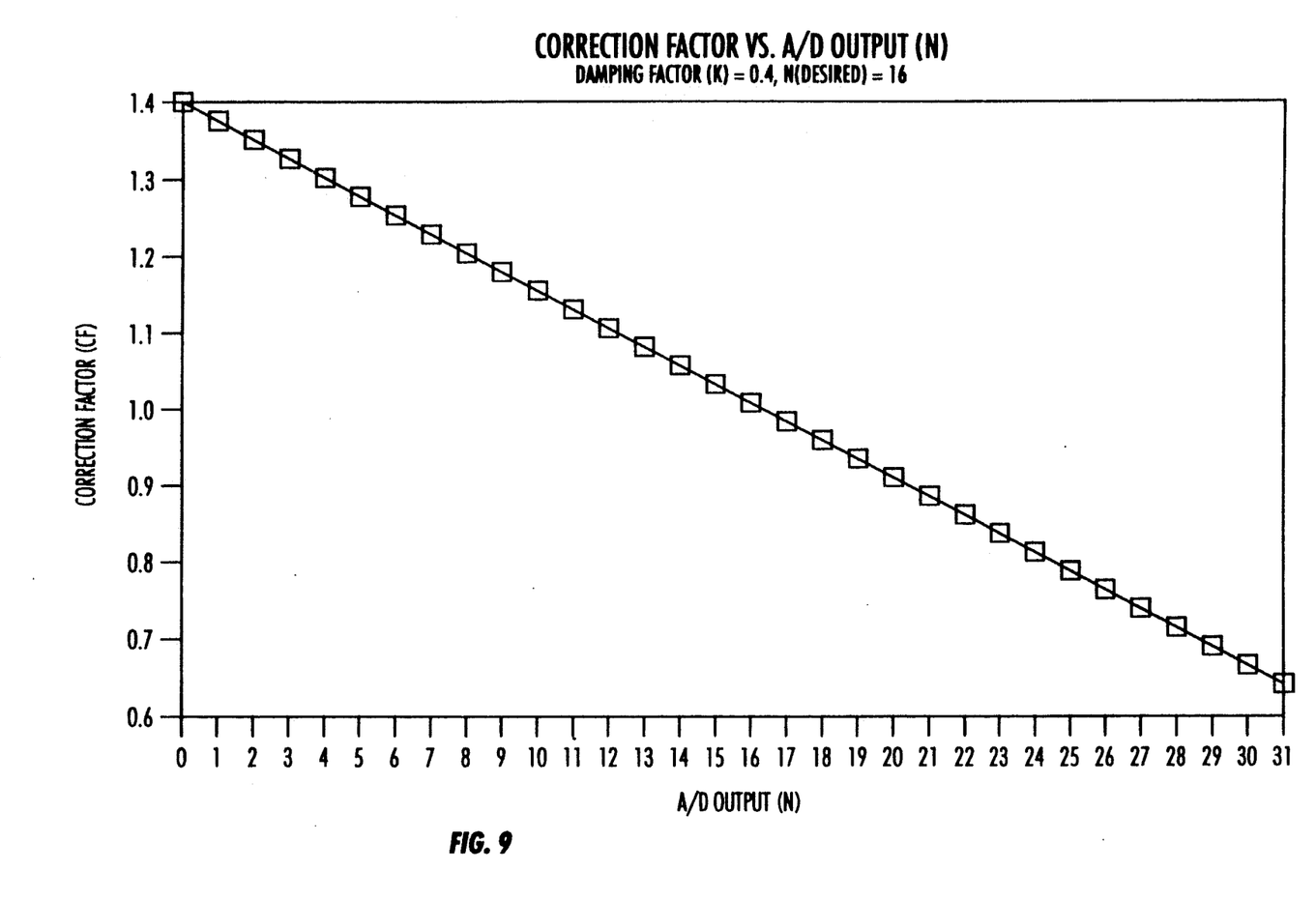
FIG. 9 illustrates a correction factor versus A/D output graph.

Equations 2 and 3 were determined based on initial calculations and empirical fine tuning. The initial calculations were based on known values, such as the desired response rate of the exposure control system 220 and the time constant of the RC filter 504. Based on this information, the maximum rate of change in the exposure control system 220 could be calculated. FIG. 9 is a graphical representation of Equations 2 and 3, illustrating the relationship between the A to D output 532 and the correction factor (CF).

In step 110, the PROM 510 converts the old exposure number, which it receives from the latch 512, to the corresponding old exposure time. As noted above, the old exposure number represents the number of dump pulses present in the Discrete mode (63.5 usec increments), and the number of 1.1 usec increments in the continuous mode such that the old exposure time is achieved. The PROM stores the results of the algorithm calculations for every possible value of old exposure number 534 and A to D output 532. In the preferred embodiment, the calculations were performed on a personal computer.

The PROM 510 performs step 110 by accessing a table which links exposure times with exposure numbers. This table is stored in the PROM 510. This table is presented below.

TABLE 1

| Exposure # (10 Bit Code) | # of Dump Pulses (Discrete mode) | 1.1 us Increments (Continuous mode) | Exposure Time (msec) |
|---|---|---|---|
| 1 | 1 | 0 | 16.558 |
| 2 | 2 | 0 | 16.494 |
| 3 | 3 | 0 | 16.431 |
| 4 | 4 | 0 | 16.367 |
| " | " | " | " |
| " | " | " | " |
| " | " | " | " |
| 247 | 247 | 0 | 0.984 |
| 248 | 248 | 0 | 0.860 |
| 249 | 249 | 1 | 0.796 |
| 250 | 249 | 2 | 0.795 |
| 251 | 249 | 3 | 0.794 |
| " | " | " | " |
| " | " | " | " |
| " | " | " | " |
| 955 | 249 | 707 | 0.006 |
| 956 | 249 | 708 | 0.005 |
| 957 | 249 | 709 | 0.004 |

For an exposure code of 251, for example, an exposure time of 0.794 msec is achieved by having 249 dump pulses during the discrete mode (each corresponding to 63.5 usec increments) and 3 increments during the continuous mode (each corresponding to 1.1 usec).

In step 112, the output of the PROM 510 represents a calculation of a new exposure time by multiplying the old exposure time with the correction factor.

In step 114, the PROM 510 refers to Table 1 to convert the new exposure time to a new exposure number. As indicated above, the new exposure number is a 10 bit control code which represents the number of dump pulses present in the Discrete mode and the number of 1.1 usec increments in the continuous mode necessary to achieve the new exposure time.

In step 116, the PROM 510 applies hysteresis in order to prevent the hunting of integration time between fields. In other words, since the A to D converter 508 quantizes the continuous average video level (from the AMP 506 in the form of a DC voltage) into a digital average video level having 32 possible values, the optimal value will always lie somewhere between two discrete values. Without hysteresis, the exposure control system 220 may bounce back and forth between two sequential quantized values (such as X and X+1). This could cause field-to-field flicker at the shorter integration times.

The hysteresis criteria of the present invention operates as follows. If the new exposure number equals the old exposure number minus 1, then the new exposure number is set to the old exposure number. If the new exposure number equals the old exposure number minus 2, then the new exposure number is set to the old exposure number minus 1. This hysteresis criteria allows the new exposure number to differ from the old exposure number only if a significant change (more than one in the negative direction) in light level has occurred.

Following step 116, the new exposure number is stored in the latch 512.

According to the present invention, the hysteresis is disabled during the last portion of the continuous mode. This is necessary in order to reduce image flicker during the shortest exposure intervals. In the preferred embodiment of the present invention, the hysteresis is disabled during the last 10 steps of the continuous mode.

In step 118, the EPLD 514 translates the new exposure number from the latch 512 into the appropriate modified charge dumping signal 406. The modified charge dumping signal 406 must coincide with the transition timing of the original static charge dumping signal (SCDS) produced in the camera timing generator of the video camera 202 (not shown in FIG. 2). The EPLD 514 is further described below.

5. EPLD

Figure 6:
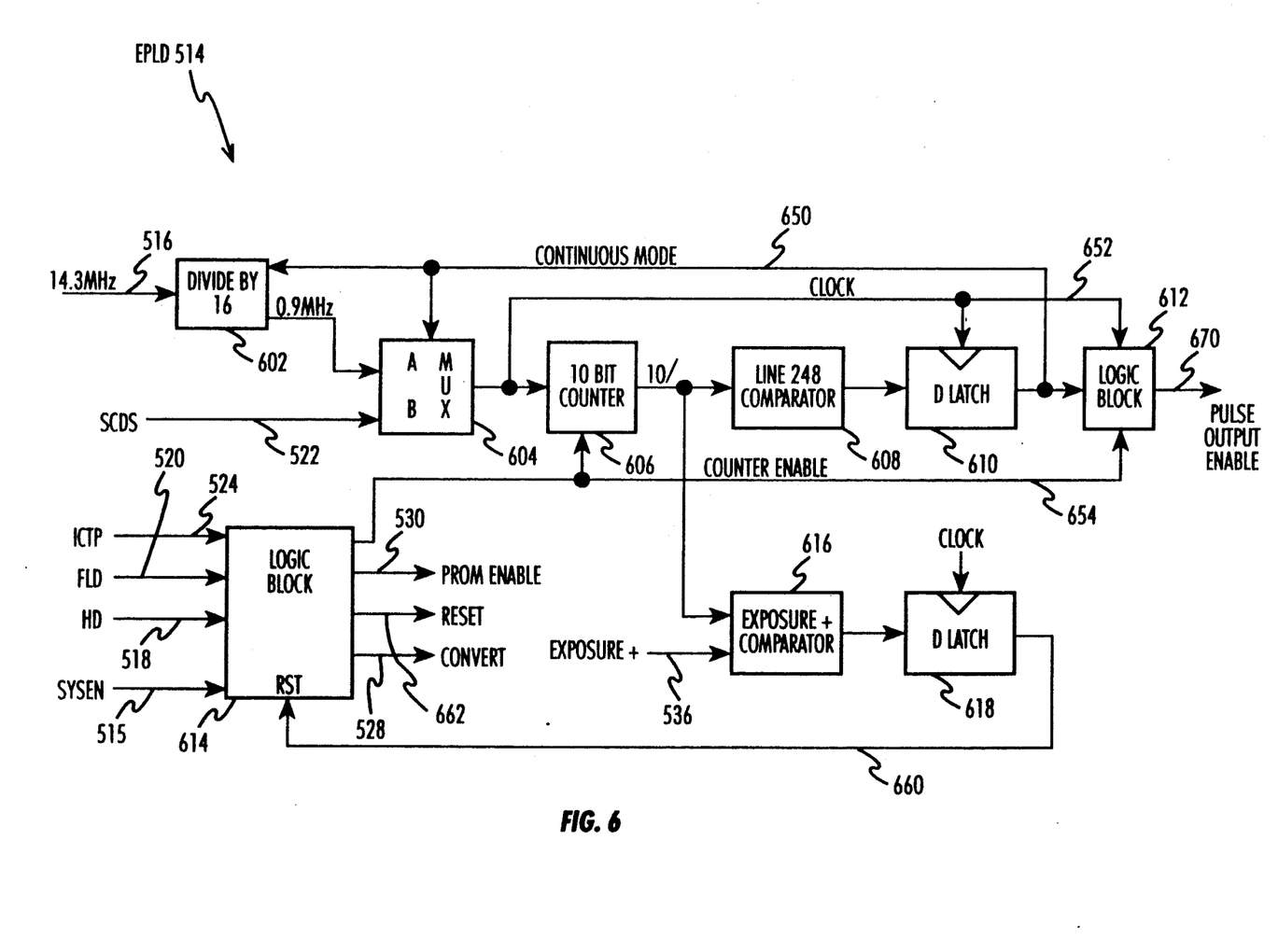
FIG. 6 illustrates a structural diagram of an EPLD.

FIG. 6 illustrates a structural diagram of the EPLD 514. As noted above, the EPLD 514 is available from a number of commercial outlets, such as Altera and Cypress. According to the present invention the EPLD 514 includes a divider 602, a multiplexer 604, a counter 606, comparators 608, 616, and latches 610, 618. These devices are well known.

The EPLD 514 also includes logic blocks 612 and 614. The following paragraphs discuss the operation of the EPLD 514 with regard to the exposure control system 220, and particularly the programming of the logic blocks 612 and 614.

As shown in both FIGS. 5 and 6, the EPLD 514 receives a number of inputs and generates a number of outputs. Specifically, the EPLD 514 receives a system enable (SYSEN) 515, a 14.3 MHz signal 516, a horizontal drive (HD) signal 518, a field signal 520, a static charge dumping signal (SCDS) 522, and an image charge transfer pulse (ICTP) 524. These signals are generated by circuitry inside the video camera 202 (not shown in FIG. 2). The EPLD 514 also receives the exposure number 536 from the latch 512.

The divider 602 divides the 14.3 MHz signal 516 by 16 and uses the resulting signal to generate the continuous steps during the continuous mode. This signal is also used to clock other functions in the EPLD 514.

The static charge dumping signal 522 pulses during each horizontal blanking interval 308. Thus, the EPLD 514 uses the static charge dumping signal 522 to determine when the horizontal blanking intervals 308 occur.

The image charge transfer pulse 524 marks the start of each new field. The EPLD 514 uses the image charge transfer pulse 524 to determine when the discrete and continuous modes begin.

The EPLD 514 uses the HD signal 518 to count down lines such that the exposure times for two interleaved fields are the same.

The EPLD 514 generates the modified charge dumping signal (MCDS—also called the pulse output enable 670) 406, a /HD signal 526, a convert signal 528, a reset signal 662 and a PROM enable signal 530.

The /HD signal 526 (not shown in FIG. 6) is the inverse of the HD signal 518. It provides the clamp pulse for the AC Couple/FET Clamp 502.

The convert signal 528 and PROM enable signal 530 are control signals to the A to D converter 508 and to the PROM 510/latch 512, respectively. They cause these components to begin operation for the next field integration period.

As noted above, the EPLD 514 translates the exposure number from the latch 512 into the appropriate modified charge dumping signal 406. The EPLD 514 performs this translation according to the programming embedded within the logic blocks 612, 614. These logic blocks 612, 614 will now be discussed.

Figure 7:
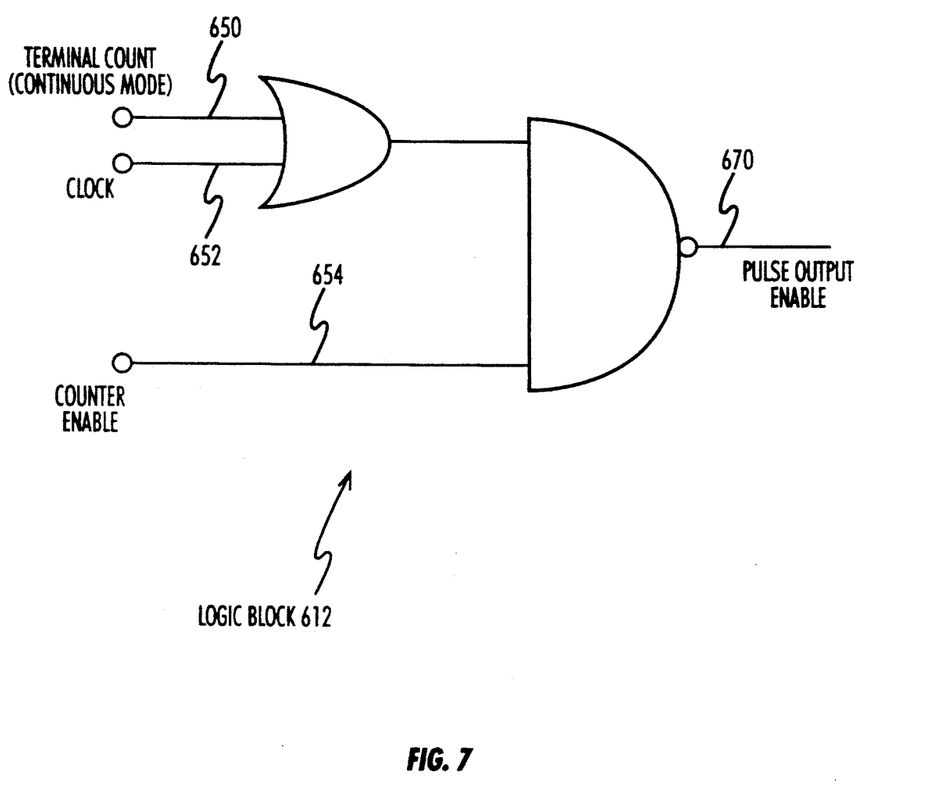
FIG. 7 illustrates a structural diagram of a logic block 612 of the EPLD.

FIG. 7 illustrates a block diagram of the logic block 612. Logic block 612 provides the output enable for the discrete and continuous pulses. Charge dumping pulses, which are either discrete or continuous, are prevented when the counter enable 654 is negated. Counter enable 654 is negated when the 10 bit counter 606 reaches terminal count (that is, it is equal to the exposure number 536 as determined by the comparator 616).

Figure 8:
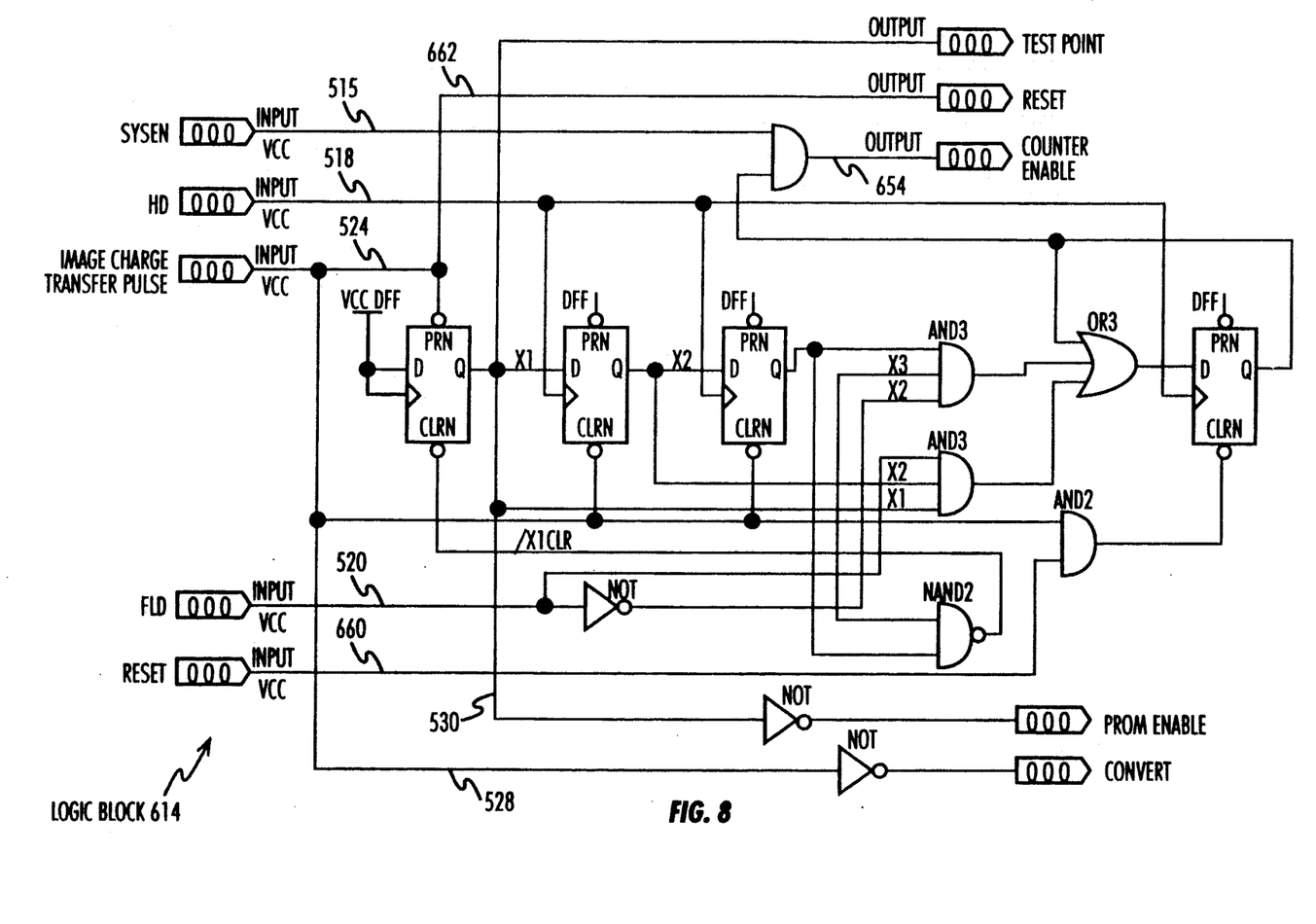
FIG. 8 illustrates a structural diagram of a logic block 614 of the EPLD.

FIG. 8 illustrates a block diagram of the logic block 614. The logic block 614 generates the PROM output enable pulse 530, the 10 bit counter enable pulse 654, the reset pulse 662, and the A/D converter "convert" pulse 528. These pulses are derived from the photosite charge transfer pulse by delaying the image charge transfer pulse 524 and synchronizing it to HD 518.

6. System Performance

The digital exposure control system 220 provides a range of exposures from 16.7 msec to 3.5 usec. This corresponds to approximately 4800:1 light range control. Near the high light level/low exposure time range, some flicker may be expected due to the 1.1 us discrete steps representing a large percentage of the total exposure time near the 3.5 us range. This is not an inherent limitation of the described invention, as greater resolution than 1.1 us can readily be generated by increasing the number of output bits beyond 10 and increasing the resolution of the A to D converter 508 beyond 5 bits, at the expense of greater circuit complexity of the PROM 510, EPLD 514, and A to D to converter 508. In consideration of circuit complexity and the image smear constraint described in the next paragraph, the disclosed design is the preferred embodiment for the present state-of-the-art.

Another artifact that occurs at high light level/short integration times is increased image smear. Experiments at 10,000 ft-L light sources revealed 5-10% image smear. This is unavoidable when using present state-of-the-art interline transfer type CCDs. Image smear has been reduced over the past several years as the state-of-the-art advances, and further improvements are anticipated. At the present time, this is the prime consideration in extending the dynamic range of the present invention.

The exposure control system 220 allows a camera to be used over a wide range of light levels without significant degradation of video quality and also without the addition of expensive shutter mechanisms. The response time is generally better than mechanical iris systems, it has higher reliability due to the lack of moving parts, and is smaller in size and lower in cost.

7. Enhancements

The exposure control system 220 could be implemented using a microcontroller. The use of a microcontroller would reduce size and power requirements by eliminating the A to D converter 508 (if included within the microcontroller), the PROM 534, and the latch 512. The microcontroller approach could be used in systems where either a microcontroller is already present, where additional control flexibility is required, or where printed circuit board (PCB) area is limited.

The exposure control system 220 may be used in many applications, such as those involved with space, commercial, or the military. When used in military applications, the following components could be used.

A to D converter 508 could be implemented using a military A to D converter such as the AD7576.

The PROM 510 could be implemented using military 27C256 PROMs which are available from Intel. Several other vendors offer alternate 32K×8 PROMs.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for controlling the amount of time a charge coupled device having a charge storage area integrates an incident light-induced charge during a field integration period, the method comprising the steps of:
   generating a measured video level;
   calculating a correction factor based on the difference between said measured video level and a desired video level;
   calculating a new optimum exposure time for a next field integration period based on said correction factor; and
   electrically causing the charge coupled device to discard charge accumulated in the charge storage area during a portion of said next field integration period, said portion defined by said new optimum exposure time.

2. The method of claim 1, wherein said step for generating a measured video level comprises the steps of:
   receiving a video signal representing charge accumulated in said charge storage area;
   clamping said video signal to ground; and
   measuring said clamped video signal.

3. The method of claim 2, wherein said step for calculating a correction factor based on the difference between said measured video level and a desired video level comprises the steps of:
   digitizing said measured video signal;
   if said digitized video signal is greater than or equal to a desired value X, then calculating said correction factor according to an equation: correction factor $= 1 - K*((N/X) - 1)$; and
   if said digitized video signal is less than said desired value X, then calculating said correction factor according to an equation: correction factor $= 1 + K*(1 - (N/X))$;
   wherein N represents said digitized video signal and K represents a damping factor.

4. The method of claim 3, wherein said step for digitizing said measured video level comprises the step of digitizing said measured video level in a range from 0 to 31, wherein said desired value X is 16.

5. The method of claim 1, wherein said step for calculating said new optimum exposure time comprises the step of multiplying said correction factor and said old exposure time.

6. The method of claim 1, wherein said step for electrically causing the charge coupled device to discard charge accumulated in the charge storage area during a portion of said next field integration period defined by said new optimum exposure time comprises the steps of:
   determining dump pulses needed during a discrete mode to attain said new exposure time; and
   generating a waveform having said dump pulses.

7. The method of claim 1, wherein said step for electrically causing the charge coupled device to discard charge accumulated in the charge storage area during a portion of said next field integration period defined by said new optimum exposure time comprises the steps of:
   determining dump pulses needed during a discrete mode to attain said new exposure time;
   determining dump intervals needed during a continuous mode to attain said new exposure time; and
   generating a waveform having said dump pulses and dump intervals.

8. The method of claim 1, wherein said step for electrically causing the charge coupled device to discard charge accumulated in the charge storage area during a portion of said next field integration period defined by said new optimum exposure time comprises the steps of:
   converting said new exposure time to a control code;
   using said control code to determine dump pulses needed during a discrete mode to attain said new exposure time; and
   generating a waveform having said dump pulses.

9. The method of claim 1, wherein said step for electrically causing the charge coupled device to discard charge accumulated in the charge storage area during a portion of said next field integration period defined by said new optimum exposure time comprises the steps of:
   converting said new exposure time to a control code;
   using said control code to determine dump pulses needed during a discrete mode to attain said new exposure time;
   using said control code to determine dump intervals needed during a continuous mode to attain said new exposure time; and
   generating a waveform having said dump pulses and dump intervals.

10. The method of claim 1, wherein said step for electrically causing the charge coupled device to discard charge accumulated in the charge storage area during a portion of said next field integration period defined by said new optimum exposure time further comprises the step of allowing said new exposure time to change only when said new exposure time significantly differs from an old exposure time.

11. The method of claim 10, wherein said step for allowing said new optimum exposure time to change only when said new optimum exposure time significantly differs from an old exposure time comprises the steps of:

if said control code equals an old exposure number minus 1, then setting said control code to said old exposure number; and if said control code equals said old exposure number minus 2, then setting said control code to said old exposure number minus 1.

12. A system for controlling exposure sensitivity for a charge coupled device having a charge storage area by controlling the amount of time the charge coupled device integrates an incident light-induced charge during a field integration period, the system comprising:

means for generating an analog measure of a video signal level;

means for digitizing said analog measured video signal level;

means for generating a correction factor based on the difference between said digitized measured video signal level and a desired video signal level;

means for generating a new optimum exposure time by modifying an old exposure time with said correction factor; and means for electrically causing the charge coupled device to discard charge accumulated in the charge storage area during a portion of a next field integration period defined by said new optimum exposure time.

13. The system of claim 12, wherein said means for generating an analog measure of a video signal level comprises:

a clamp for clamping a video signal to ground, wherein said video signal represents charge accumulated in the charge storage area; and means, coupled to said clamp, for measuring said clamped video signal.

14. The system of claim 12, wherein said means for digitizing said analog measured video signal level comprises means for digitizing said analog measured video signal level in a range having a desired value X.

15. The system of claim 14, wherein said range is 0 to 31 and said desired value X is 16.

16. The system of claim 14, wherein said means for generating a correction factor by comparing said digitized measured video signal level with a desired video signal level comprises:

means for calculating said correction factor according to an equation: correction factor $= 1 - K * ((N/X) - 1)$ when said digitized video signal level is greater than or equal to said desired value X; and means for calculating said correction factor according to an equation: correction factor $= 1 + K * (1 - (N/X))$ when said digitized video signal level is less than said desired value X;

wherein N represents said digitized video signal level and K represents a damping factor.

17. The system of claim 12, wherein said means for generating a new exposure time by modifying an old exposure time with said correction factor comprises means for multiplying said old exposure time and said correction factor.

18. The system of claim 12, wherein said means for electrically causing the charge coupled device to discard charge accumulated in the charge storage area during a portion of a next field integration period defined by said new optimum exposure time comprises:

means for converting said new optimum exposure time to a control code;

means for using said control code to determine dump pulses needed during a discrete mode to attain said new optimum exposure time; and means for generating a waveform having said dump pulses.

19. The system of claim 12, wherein said means for electrically causing the charge coupled device to discard charge accumulated in the charge storage area during a portion of a next field integration period defined by said new optimum exposure time comprises:

means for converting said new optimum exposure time to a control code;

means for using said control code to determine dump pulses needed during a discrete mode to attain said new optimum exposure time;

means for using said control code to determine dump intervals needed during a continuous mode to attain said new optimum exposure time; and means for generating a waveform having said dump pulses and dump intervals.

20. The system of claim 19, wherein said means for electrically causing the charge coupled device to discard charge accumulated in the charge storage area during a portion of a next field integration period defined by said new optimum exposure time further comprises means for allowing said new exposure time to change only when said new optimum exposure time significantly differs from an old exposure time.

21. The system of claim 20, wherein said means for allowing said new optimum exposure time to change only when said new optimum exposure time significantly differs from an old exposure time comprises:

means for setting said control code to an old exposure number when said control code equals said old exposure number minus 1; and means for setting said control code to said old exposure number minus 1 when said control code equals said old exposure number minus 2.

22. A camera imager, comprising:

a charge coupled device, having a charge storage area and a drain off region, exposed to incident light during a field integration period, said charge coupled device configured to generate a video signal representing the charge accumulated in said charge storage area during the field integration period;

an exposure control system, coupled to said charge coupled device, comprising:

means for calculating a correction factor based on the difference between a measured video level and a desired video level;

means for calculating a new optimum exposure time for a next field integration period based on said correction factor; and means for electrically causing said charge coupled device to discard charge accumulated in said charge storage area during a portion of said next field integration period defined by said new optimum exposure time.

23. The camera imager of claim 22, wherein said means for calculating a new optimum exposure time for a next field integration period comprises:

means for generating an analog average video signal level;

means for digitizing said analog average video signal level in a range having a desired value X;

means for calculating a correction factor according to an equation: correction factor=1−K*((N/X)−1) when said digitized light level signal is greater than or equal to said desired value X;

means for calculating said correction factor according to an equation: correction factor=1+K*(1−(N/X)) when said digitized light level signal is less than said desired value X; and means for calculating said new optimum exposure time by multiplying said correction factor and an old exposure time;

wherein N represents said digitized video signal level and K represents a damping factor.

24. The system of claim 23, wherein said range is 0 to 31 and said desired value X is 16.

25. The camera imager of claim 22, wherein said means for electrically causing said charge coupled device to discard charge accumulated in said charge storage area during a portion of said next field integration period defined by said new optimum exposure time comprises:

means for determining dump pulses needed during a discrete mode to attain said new exposure time; and means for generating a waveform having said dump pulses.

26. The camera imager of claim 22, wherein said means for electrically causing said charge coupled device to discard charge accumulated in said charge storage area during a portion of said next field integration period defined by said new optimum exposure time comprises:

means for determining dump pulses needed during a discrete mode to attain said new exposure time;

means for determining dump intervals needed during a continuous mode to attain said new optimum exposure time; and means for generating a waveform having said dump pulses and dump intervals.

* * * * *